United States Patent
Sams et al.

[11] Patent Number: 5,565,078
[45] Date of Patent: Oct. 15, 1996

[54] APPARATUS FOR AUGMENTING THE COALESCENCE OF WATER IN A WATER-IN-OIL EMULSION

[75] Inventors: Gary W. Sams, Tulsa; Floyd L. Prestridge, Sapulpa; Merle B. Inman, Tulsa, all of Okla.

[73] Assignee: National Tank Company, Houston, Tex.

[21] Appl. No.: 223,056

[22] Filed: Apr. 6, 1994

[51] Int. Cl.[6] ............... C10G 33/02; B01D 17/038; B01D 17/06
[52] U.S. Cl. .......................... 204/671; 204/564
[58] Field of Search ............... 204/186, 188–191, 204/302, 304–308

[56] References Cited

U.S. PATENT DOCUMENTS

| | | | |
|---|---|---|---|
| 1,558,382 | 10/1925 | Marx | 204/545 |
| 1,565,997 | 12/1925 | Girvin | 204/669 |
| 3,758,399 | 9/1973 | Pendergrass | 204/663 |
| 4,116,790 | 9/1978 | Prestridge | 204/563 |
| 4,341,617 | 7/1982 | King | 204/671 |
| 4,601,834 | 7/1986 | Bailes et al. | 210/748 |
| 4,747,921 | 5/1988 | Bailes et al. | 204/558 |
| 4,801,370 | 1/1989 | Arnesen | 204/667 |

FOREIGN PATENT DOCUMENTS

| | | | |
|---|---|---|---|
| 0617115A1 | 3/1994 | European Pat. Off. | C10G 33/02 |
| WO92/05853 | 4/1992 | WIPO | B01D 17/038 |

*Primary Examiner*—John Niebling
*Assistant Examiner*—William T. Leader
*Attorney, Agent, or Firm*—Head, Johnson & Kachigian

[57] ABSTRACT

A method and apparatus of augmenting the coalescence of water in a water-in-oil emulsion in which the emulsion is tangentially ejected into the interior of a cylindrically walled vessel to cause the emulsion to flow circumferentially within the vessel and to thereby cause the water component of the emulsions to migrate towards the vessel cylindrical wall, the vessel having an axially positioned electrode therein. A voltage, preferably a pulsating DC voltage, is imposed between the electrode and the vessel to thereby subject the swirling water-in-oil emulsion to an electrical potential to cause the water components to coalescence from smaller to larger droplets. The water-in-oil emulsion is passed from the vessel where the water component can be more effectively separated from the emulsion by gravitational or centrifugal separation.

2 Claims, 2 Drawing Sheets

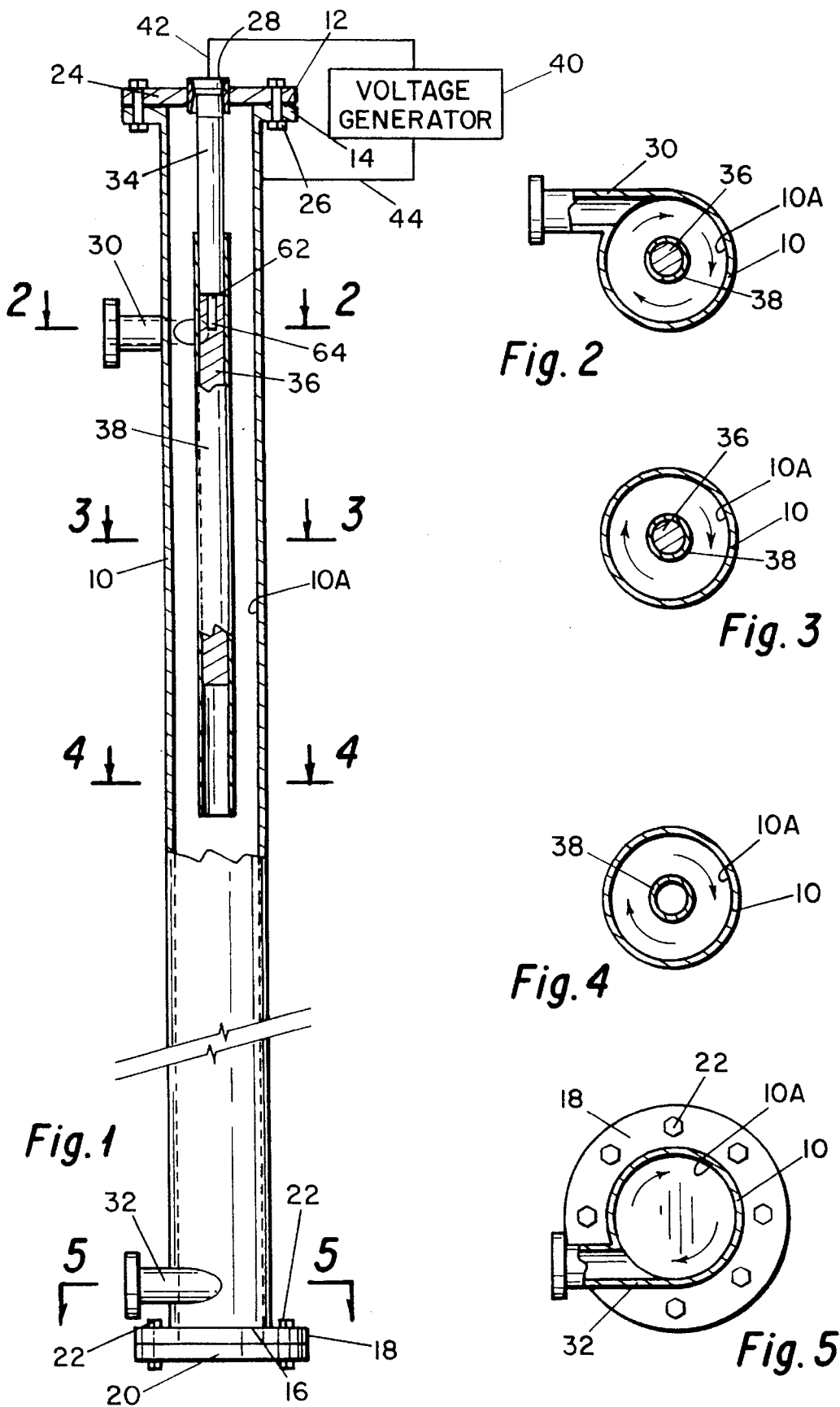

APPARATUS FOR AUGMENTING THE COALESCENCE OF WATER IN A WATER-IN-OIL EMULSION

CROSS-REFERENCE TO RELATED APPLICATIONS

The present application is not related to any pending patent applications.

CROSS-REFERENCE TO MICROFICHE APPENDIX

This application is not referenced to a microfiche appendix.

BACKGROUND OF THE INVENTION

Electrostatic treatment of oil and water has been used by the oil industry for many years to aid in the separation of water from an oil-continuous stream. Treating a water-in-oil emulsion by passing it through a high voltage electrostatic field has been shown to promote rapid coalescence of the water droplets leading to rapid separation. However, this method has traditionally been limited to water contents in the oil up to only about 20%. Electrostatic voltage sources include AC, DC and combined AC/DC. Attempts to increase the allowable inlet water content have been limited due to the electrically conductive nature of high water content emulsions.

An electrostatic method developed by Dr. Philip Bailes and Steve Larkai of the University of Bradford has proven to successfully treat emulsions with water contents as high as 70% or more. The emulsion must remain oil-continuous with the water finely dispersed throughout. The Bailes/Larkai coalescer solves the high conductivity problem by using two methods, namely an insulated electrode and a pulsed DC voltage field. However, standard vessel designs as commonly used in industry have proven unsatisfactory for the purpose of treating high water content oilfield emulsions operating at high pressures.

For additional background information relating to the basic subject matter of this invention, reference may be had to U.S. Pat. Nos. 4,601,834 and 4,747,921, both of which patents are incorporated herein by reference.

BRIEF SUMMARY OF THE INVENTION

This invention embodies a coalescer concept in a cylindrical cylinder using a central insulated electrode. The water-in-oil emulsion enters the cylinder tangentially through the inlet nozzle located at one end of the cylinder to impart a rotational motion to the fluid. The exit nozzle is installed tangentially at the opposite end of the cylinder to maintain the rotation of the fluid as it anticipates the outlet.

A central electrical conductor acting as the charged electrode is located along the central axis of the cylinder extending along the major portion of the length. An insulating material is specifically chosen to exert the maximum electrostatic field across the emulsion to be processed and extends an appropriate distance above and below the conductive component. The electrode is a smaller cylinder forming an annular cavity between itself and the larger vessel. The electrode is held in place by a high voltage feed through bushing passing high voltage through the vessel head at one end. The emulsion to be treated spirals around the center electrode as it passes along the length of the vessel. Centrifugal forces move the denser, more conductive component of the emulsion (water) away from the charged central electrode, thereby greatly reducing the electrical forces exerted on the insulating material and placing more coalescing force on the emulsion. The insulating effect of the dryer oil around the charged electrode allows the use of thinner insulating material, thus further reducing field losses across the insulator. In some operations, the centrifugal forces will eliminate the need for an insulated electrode.

A high voltage, which may be pulsating, is applied to the electrode as emulsion is spiralling around it. This electrical field promotes coalescence. Specifically, when a pulsating voltage is employed droplet chains are produced during periods of high voltage followed by rapid coalescence during periods of no voltage. A proper pulse frequency can further enhance the coalescence rate for the water dispersed in the oil. This coalesced water moves to the inner wall of the cylinder due to the centrifugal force applied to the water droplets by the spiralling emulsion. This movement of the bulk of the water away from the electrode reduces the electrical conductivity of the oil adjacent the electrode and allows enhanced treatment of the drier emulsion remaining near the center electrode.

This application of the coalescer of this disclosure has been shown to improve water separation rates by as much as 1250% over conventional gravity separation methods.

A better understanding of the invention can be obtained from the following description of the preferred embodiments, taken in conjunction with the attached drawings.

DESCRIPTION OF THE DRAWINGS

FIG. 1 is an elevational view of an apparatus for augmenting the coalescence of water in a water-in-oil emulsion, the apparatus being shown partially broken away. An electrode element used in the apparatus is also partially shown in cross-section.

FIG. 2 s a cross-sectional view of the coalescer taken along the line 2—2 of FIG. 1 showing the tangential fluid inlet.

FIG. 3 s a cross-sectional view of the coalescer taken along the line 3—3 of FIG. 1.

FIG. 4 s a cross-sectional view of the coalescer taken along the line 4—4 of FIG. 1.

FIG. 5 s a cross-sectional view of the coalescer as taken along the line 5—5 of FIG. 1 showing the tangential fluid outlet.

DESCRIPTION OF THE PREFERRED EMBODIMENTS

Figures 6, 7:
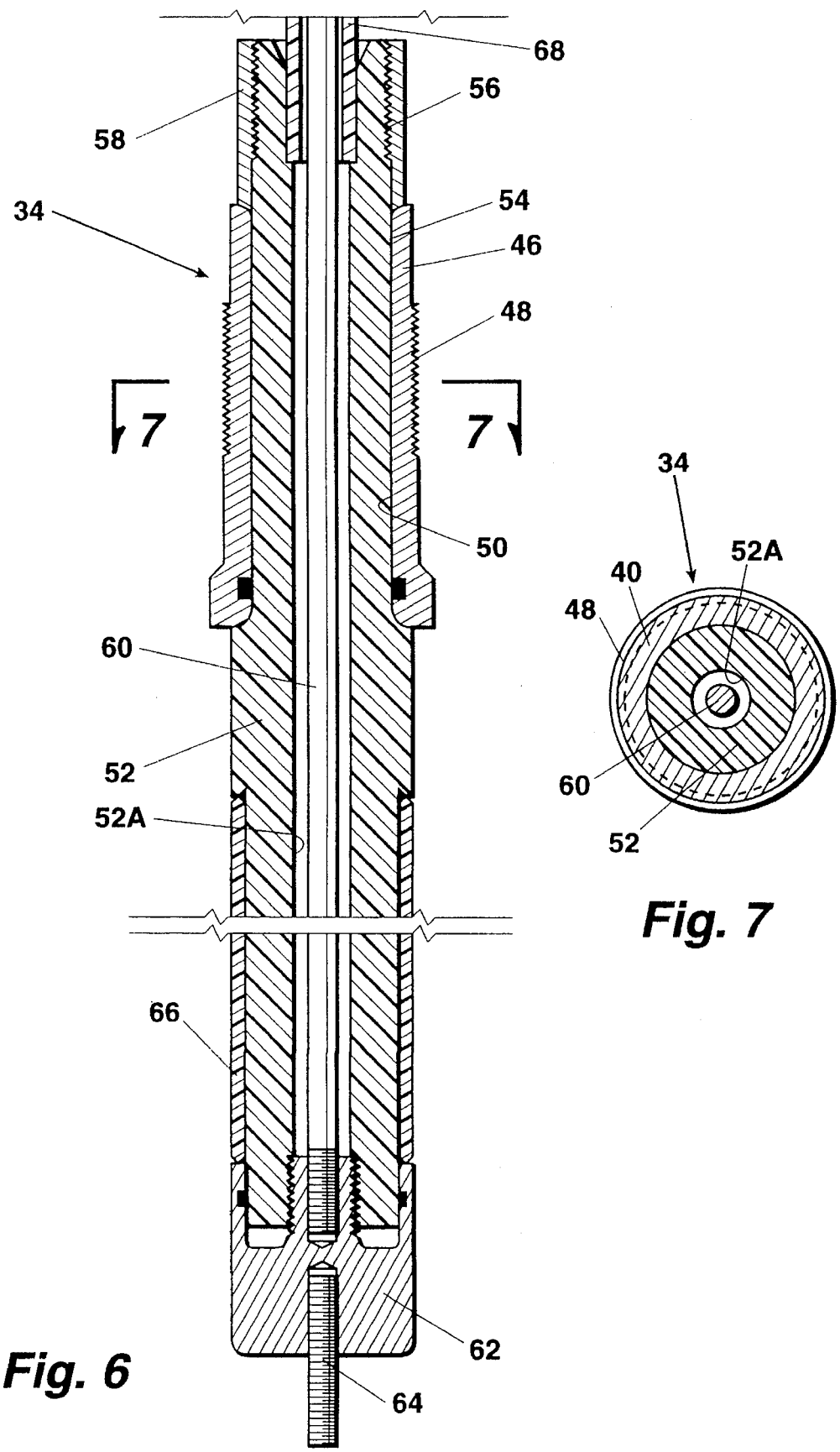
FIG. 6 s an enlarged cross-sectional view of a preferred embodiment of an entrance bushing as used in the coalescer of FIG. 1 and showing how the bushing is mounted in the coalescer tubular vessel.
FIG. 7 is a cross-sectional view of the bushing as taken along the line 7—7 of FIG. 6.

Referring to the drawings and first to FIGS. 1 through 5, the basic structure of the apparatus for augmenting the coalescence of water in a water-in-oil emulsion is shown. An elongated tubular vessel 10 has a top end 12 provided with flange 14 and a bottom end 16 provided with flange 18. A blind flange plate 20 is secured to bottom flange 18 by bolts 22 to close the bottom of the vessel. The top of the vessel has a closure member 24 held to top flange 14 by bolts 26. The closure member 24 has a threaded opening 28 therein.

A tangential fluid inlet 30 communicates with the wall of vessel 10 adjacent top 12. The tangential inlet 30 is configured, as shown in FIG. 2, to cause fluid introduced into the vessel to flow in a circuitous path. A tangential outlet 32 communicates with the vessel wall adjacent bottom end 16. As shown in FIG. 5, tangential outlet 32 augments the circumferential flow of fluid within the vessel since it provides for tangential exit of the fluid as it passes out of the vessel. Tangential inlet 30 and outlet 32 are an important aspect of the invention, since they cause the fluid in the cylindrical vessel to flow in a circumferential, spiraled path. The circumferential flow, as indicated by the arrows in the cross-sectional views of FIGS. 2 through 5, causes centrifugal force to be applied to the fluid moving the heavier component, that is, the water component of the water-in-oil emulsion, towards the vessel interior wall 10A. It also has the effect of retaining the lighter component, that is the oil component of a water-in-oil emulsion, adjacent the center of the vessel for advantages that will be described substantially.

Received within threaded opening 28 in closure member 24 is bushing 34. Affixed to bushing 34 is an electrode formed of two basic components, that is, a central conductive rod 36 surrounded by an insulator sleeve 38.

Bushing 34 provides means of supporting the electrode formed of conductive rod 36 and insulator sleeve 38 axially within the interior of vessel 10 so that the electrode extends for at least a substantial portion of the length of the vessel. Further, bushing 34 provides means of applying an electrical potential to the electrode conductive rod 36. In FIG. 1, the source of the electrical potential is a voltage generator 40 having a first conductor 42 connected to bushing 34 and a second conductor 44 connected to vessel 10. The nature of the voltage applied between the electrode 36 and vessel 10 will be discussed subsequently.

Referring to FIGS. 6 and 7, an enlarged more detailed view of a preferred embodiment of bushing 34 is illustrated. Bushing 34 includes a hub 46 having an enlarged diameter portion which is externally threaded at 48. Threads 48 of hub 46 are received into threaded opening 28 of closure member 24 as described with reference to FIG. 1.

Hub 46 is tubular having an interior surface 50 that receives tubular insulator 52 having an internal tubular opening 52A. Insulator 52 has a reduced diameter portion 54 adjacent its upper end that is received in hub 46. The upper end of reduced diameter portion 54 is externally threaded at 56. Received on thread 56 is a tubular retainer nut 58, the lower end of which engages hub 46 to thereby retain insulator 52 within hub 46.

Received within tubular insulator 52 is a conducting rod 60 made of metal, such as steel, copper or the like. The lower end of rod 60 is threaded to threadably engage a conductive end part 62. All thread stud 64 extends from the end part 62.

Received on the lower portion of insulator 52 is a sleeve of non-conductive material 66. At the upper end of the bushing, a short length sleeve 68, which may be Teflon® tubing, is positioned around rod 60 where it emerges from at the upper end of insulator 52.

FIG. 1 shows bushing 34 in a generalized manner for supporting an insulated electrode 36, 38, whereas FIGS. 6 and 7 show a preferred embodiment of the bushing.

When the bushing of FIGS. 6 and 7 is employed, conductive rod 36 is attached to the bushing end part 62 by means of the all thread screw 64. Thus, bushing 34 of the type shown in FIGS. 6 and 7 supports conductive rod 36 surrounded by an insulated sleeve 38 to extend a substantial portion of the length of the vessel 10, as previously described.

FIGS. 6 and 7 are exemplary of a preferred type of bushing that may be employed in supporting the insulated electrode centrally within the vessel.

Voltage generator 40 preferably is the type that generates pulsating DC voltage in a manner as described in U.S. Pat. No. 4,601,834. As described in this patent, as a pulsating DC voltage is supplied, water components of a water-in-oil emulsion having finally dispersed droplets are caused to coalesce, that is, to join together to form droplet chains during periods of high voltage. During subsequence periods of reduced or no voltage, the droplet chains coalesce, that is, merge together to form larger drops of water. By this coalescing action, the water component of the water-in-oil emulsion is consolidated in larger droplets which respond to gravitational and centrifugal separation. Thus, the device of FIG. 1 is utilized in advance of a gravitational or centrifugal separation vessel (not shown) to augment the separation of water from the emulsion.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. Apparatus for augmenting the coalescence of water in an emulsion having a heavier, relatively electrically conductive water component and a lighter, relatively non-conductive oil component, comprising:

a tubular vessel having a cylindrical sidewall and opposed first and second ends;

an elongated conductive electrode of external diameter less than the internal diameter of the vessel, the electrode extending concentrically within said vessel;

a closure closing said vessel first end, the closure having a threaded opening therein concentric with said tubular vessel and including means extending sealably through said opening to conduct an electrical potential to said electrode, wherein said means extending sealably through said opening includes an elongated tubular insulator having a conducting rod received therein;

a tubular hub received on the exterior of said tubular insulator, the tubular hub being externally threaded and treadably received in said threaded opening, the tubular hub serving to support said insulator concentrically within said vessel;

a tangential inlet in said cylindrical sidewall adjacent one of said vessel ends;

a tangential outlet in said cylindrical sidewall adjacent the other of said vessel ends; and means for applying an electrical charge to said electrode, said tangential inlet and outlet serving to cause said emulsion to flow through said vessel in a circumferential path to impart centrifugal forces on said emulsion and to thereby permit said heavier, relatively electrically conductive water component to migrate radially outwardly away from said electrode and to permit said lighter, relatively non-conductive oil component to migrate inwardly towards said electrode whereby a higher electrical potential may be applied to said electrode.

2. An apparatus for augmenting the coalescence of water in an emulsion according to claim 1 wherein said means for applying an electrical charge to said electrode includes means for applying a pulsating DC voltage.

* * * * *